United States Patent Office 3,579,539
Patented May 18, 1971

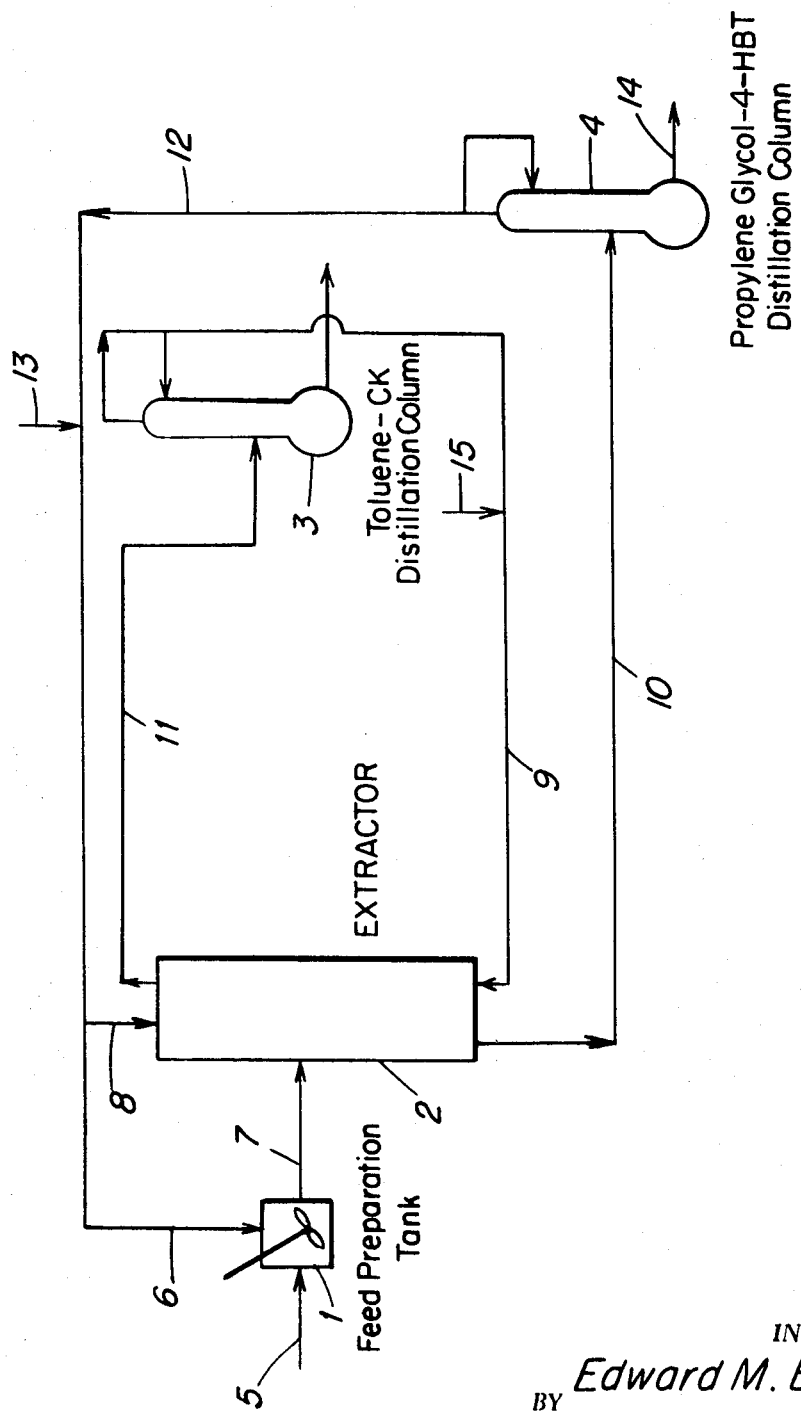

3,579,539
DUAL SOLVENT SEPARATION OF 4-HYDROXY-BENZOTHIOPHENE FROM 4-OXO-4,5,6,7-TETRA-HYDROBENZOTHIOPHENE
Edward M. Bullard, Fords, N.J., assignor to
Mobil Oil Corporation
Filed Jan. 16, 1969, Ser. No. 791,614
Int. Cl. C07d 63/18, 63/22
U.S. Cl. 260—330.5                                    2 Claims

ABSTRACT OF THE DISCLOSURE 4-hydroxybenzothiophene is separated from 4-oxo-4,5,6,7-tetrahydrobenzothiophene by liquid-liquid extraction using a dual solvent system of a polar solvent, preferably propylene glycol, and a non-polar solvent, preferably toluene. The 4-hydroxybenzothiophene can be converted into N-methyl-4-benzothienyl carbamate, an effective pesticide (see U.S. 3,288,673 and 3,288,808).

BACKGROUND OF THE INVENTION

Field of the invention

This invention is directed to liquid-liquid extraction. It is more particularly concerned with a dual solvent extraction of 4-hydroxybenzothiophene from admixture with 4-oxo-4,5,6,7-tetrahydrobenzothiophene.

Description of the prior art

In the synthesis steps to produce N-methyl-4-benzothienylcarbamate, 4-oxo-4,5,6,7-tetrahydrobenzothiophene is dehydrogenated to 4-hydroxybenzothiophene, e.g., as per the disclosure of U.S. 3,345,382. Generally, about 70 percent conversion is obtained. Thus, there is a problem of separating the product from unreacted oxo compound. Methods of separation, such as caustic extraction or fractional distillation, have not been sufficiently efficient. The use of dual solvent extraction to separate 4-hydrobenzothiophene has not been proposed, insofar as is now known.

SUMMARY OF THE INVENTIONN

This invention provides a process for separating 4-hydroxybenzothiophene from admixture with 4-oxo-4,5,6,7-tetrahydrobenzothiophene that comprises contacting the mixture with a countercurrent flow of a polar solvent selective for 4-hydroxybenzothiophene and of a non-polar solvent selective for 4-oxo-4,5,6,7-tetrahydrobenzothiophene.

DESCRIPTION OF THE DRAWING

The single figure presents a schematic arrangement of a method for carrying out the extraction process of this invention on a continuous basis.

DESCRIPTION OF SPECIFIC EMBODIMENTS

In the following description including the tables, the nomenclature is simplified by designating the 4-oxo-4,5,6,7-tetrahydrobenzothiophene (cyclic ketone) as CK and the 4-hydroxybenzothiophene as 4-HBT.

The process of this invention utilizes liquid phase extraction techniques with somplementary polar and non-polar solvents. The polar solvent selectively dissolves the 4-HBT, while the non-polar solvent selectively dissolves the CK. By utilizing well-known liquid extraction techniques and equipment and sufficient theoretical extraction stages, there are obtained a polar extract phase containing substantially all the 4-HBT substantially free of CK and a non-polar solvent raffinate phase containing substantially all the CK substantially free of 4-HBT.

The polar solvents utilizable are the normally liquid hydroxy-containing organic materials, particularly alcohols, such as methanol-water, and glycols, such as ethylene glycol and propylene glycol. Propylene glycol is especially preferred, because of its higher solvent capacity for 4-HBT.

The non-polar solvents used in the present process are liquid paraffinic or aromatic hydrocarbons, such as hexane, n-pentane, n-dodecane, benzene, toluene, and xylene. Toluene is the preferred non-polar solvent.

Two major criteria affect the extraction process of this invention. One is that the concentration of either component in its phase should not exceed 10 weight percent. The other is that the weight ratio of polar solvent should be between about 1.2 and about 2.0, preferably between about 1.2 and about 1.6, and more preferably about 1.5. Thus, the weight ratio of total solvent (polar and non-polar) to total CK and 4-HBT depends on the weight ratio of CK to 4-HBT at a specified solvent pair ratio.

EXAMPLES 1 THROUGH 9

A series of batch extraction runs were carried out at 40° C. in a stirred, heated glass vessel open to the atmosphere through a condenser. In each run, the amounts of CK, 4-HBT, propylene glycol, and toluene were varied as shown in the table. Pertinent data and results are set forth in the table. Analyses were done by vapor phase chromatography using a calibrated internal standard.

TABLE

| Example | 1 | 2 | 3 | 4 | 5 | 6 | 7 | 8 | 9 |
|---|---|---|---|---|---|---|---|---|---|
| Charge (grams): | | | | | | | | | |
| CK | 1.53 | 2.85 | 2.0 | 1.0 | 0.783 | .55 | 8.01 | 8.0 | 8.0 |
| HBT | 1.115 | 3.28 | 4.0 | 3.0 | 2.55 | 5.63 | .99 | 5.1 | 7.6 |
| Propylene glycol | (¹) | (¹) | 25.85 | 25.9 | 40 | 75 | 75.5 | 75 | 75 |
| Toluene | (¹) | (¹) | 20.5 | 20.1 | 60 | 55.8 | 51.3 | 50 | 50 |
| Phase weight (grams): | | | | | | | | | |
| Upper phase | 15.7 | 16.2 | 15.31 | 16.4 | 52.3 | 37.8 | 35.6 | 36.6 | 29.71 |
| Lower phase | 34.3 | 33.0 | 35.31 | 31.6 | 46.3 | 95.4 | 97.2 | 102.59 | 108.03 |
| Matl. balance, percent | | | 96.7 | 96 | 93.5 | 97.5 | 97.6 | 103 | 97.9 |
| Analysis: | | | | | | | | | |
| Toluene phase, percent: | | | | | | | | | |
| CK | 4.76 | 6.82 | 4.1 | 2.6 | 1.13 | 0.346 | 8.83 | 9.32 | 9.06 |
| HBT | .517 | 2.55 | 3.67 | 4.5 | .113 | | .10 | 1.34 | 3.15 |
| Propylene glycol phase, percent: | | | | | | | | | |
| CK | 1.95 | 4.42 | 1.85 | 1.78 | .865 | 0.42 | 4.9 | 4.95 | 5.34 |
| HBT | 2.21 | 6.65 | 8.87 | 8.65 | 3.65 | 5.35 | .292 | 5.12 | 8.87 |

¹ 25 milliliters.

Based upon the date, equilibrium curves can be plotted for CK and for 4-HBT. Then, the number of theroetical stages for continuous extraction at a given solvent ratio can be determined, using the well-known procedure set forth on pages 314–19 in Treybal "Liquid Extraction" second edition 1963), McGraw-Hill Book Company, Inc. At a ratio of propylene glycol to toluene of 1.5, the number of stages is 16, 8.65 on bottom and 7.4 on the top. At 1.2 ratio no reduction in stages is found, but more solvent is used. At a ratio of 2, the number of stages is about 20.

Referring to the figure, there is presented a schematic arrangement of a method for carrying out the extraction process of this invention on a continuous basis. The essential equipment includes a feed preparation tank 1, and extractor 2, a toluene distillation unit 3, and a propylene glycol distillation unit 4. The extractor 2 can be any of a variety of conventional and well-known liquid-liquid continuous extracting apparatus, such as, for example, a countercurrent extraction column in which polar solvent is fed at one end, and non-polar solvent is fed at the other end for countercurrent flow, and feed to be extracted is introduced at an intermediate point. The tank 1 and the columns 3 and 4 are conventional.

The operation is illustrated using the preferred solvent pair of propylene glycol and toluene. A feed containing about 33 weight percent CK and about 67 weight percent 4-HBT is introduced through a line 5 into the tank 1, wherein it is admixed with a propylene glycol-rich stream (about 86 weight percent propylene glycol, balance toluene), introduced through a line 6. The feed mixture is introduced into the extractor 2 through a line 7 at about the eighth stage of the sixteen-stage reactor. Additional propylene glycol-rich stream is introduced at the top of the extractor 2 through a line 8. A toluene-rich stream (95 percent toluene) is introduced at the bottom of extractor 2 through a line 9.

In the extractor 2, operated at about 40° C. and atmospheric pressure, the propylene glycol-rich stream and the toluene-rich streams flow countercurrently and contact the feed. The propylene glycol-rich stream flows downwardly and extracts 4-HBT and is removed through a line 10 and passed to the propylene glycol distillation unit 4. The toluene-rich stream moves upward and becomes enriched in CK. It is removed as the raffinate through a line 11 and passed to the toluene distillation unit 3.

In the propylene glycol distillation unit 4, a propylene glycol-rich stream is distilled off and removed through a line 12. Make-up propylene glycol is added through a line 13 and the stream is recycled through lines 6 and 8. The 4-HBT product is removed through a line 14 in about 96 percent purity.

In the toluene distillation unit 3, a toluene-rich stream is distilled off and passed through line 9, together with make-up toluene introduced through a line 15, back to the extractor 2. The CK is removed through a line 16 in about 82 percent purity. The recovered CK can be passed back to a dehydrogenation unit for further conversion to 4-HBT.

The extraction process of this invention can be operated at temperatures between about 20° C. and about 45° C., preferably at about 35–45° C. The process is feasibly carried out at atmospheric pressure. No advantage was found in superatmospheric pressure operation.

EXAMPLE 10

In a typical extraction operation using the flow system shown in the figure, a feed of CK-4-HBT mixture is charged at a rate of 50 lb./hr. 4-HBT and 25 lb./hr. CK in propylene glycol (350 lb./hr.), at an intermediate point of a sixteen-stage extraction column. Propylene glycol is charged to the top of the column at a rate of 250 lb./hr. to flow downwardly and toluene is charged at a rate of 500 lb./hr. to the bottom of the column to flow upwardly. The effluent streams, in pounds per hour, contain (at the top) 500 lb. toluene, 23 lb. CK and 5 lb. 4-HBT and (at the bottom) 600 lb. propylene glycol, 45 lb. 4-HBT and 2 lb. CK.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for separating 4-hydroxy-benzothiophene from admixture with 4-oxo-4,5,6,7-tetrahydrobenzothiophene that comprises contacting the mixture with a counter-current flow of a polar solvent selected from the group consisting of methanol-water, ethylene glycol, and propylene glycol and of a non-polar solvent selected from the group consisting of hexane, n-pentane, n-dodecane, benzene, toluene and xylene.

2. The process of claim 1, wherein said polar solvent is propylene glycol and said non-polar solvent is toluene.

References Cited

UNITED STATES PATENTS 3,317,552   5/1967   Kaufman, et al. _____ 260—304

HENRY R. JILES, Primary Examiner

C. M. SHURKO, Assistant Examiner

U.S. Cl. X.R.

260—332.3